United States Patent [19]
Nuckolls et al.

[11] Patent Number: 5,432,944
[45] Date of Patent: Jul. 11, 1995

[54] DATA PROCESSING SYSTEM HAVING A DYNAMICALLY ENABLED INPUT SYNCHRONIZER FOR SELECTIVELY MINIMIZING POWER CONSUMPTION

[75] Inventors: Charles E. Nuckolls; Donald L. Tietjen; Jesse R. Wilson, all of Austin, Tex.

[73] Assignee: Motorola, Inc., Schaumburg, Ill.

[21] Appl. No.: 740,236

[22] Filed: Aug. 5, 1991

[51] Int. Cl.6 .......................... G06F 1/32; G06F 1/12; G11C 13/00
[52] U.S. Cl. .................... 395/750; 395/550; 395/800; 364/DIG. 2; 364/226.9; 364/270.5; 364/271; 364/945.9; 364/948.8; 364/950.1; 364/950.3; 364/707; 365/227; 345/213; 340/825.2; 340/852.14
[58] Field of Search ........... 395/550, 800, 750; 340/825.2, 825.14, 825.2; 365/227; 364/707; 345/213

[56] References Cited

U.S. PATENT DOCUMENTS

| | | | |
|---|---|---|---|
| 4,151,611 | 4/1979 | Sugawara et al. | 365/227 |
| 4,379,327 | 4/1983 | Tietjen et al. | 395/325 |
| 4,386,401 | 5/1983 | O'Brien | 395/550 |
| 4,476,527 | 10/1984 | Clayton, IV | 395/275 |
| 4,622,669 | 11/1986 | Pri-Tal | 371/29.5 |
| 4,758,945 | 7/1988 | Remedi | 395/750 |
| 4,785,415 | 11/1988 | Karlquist | 395/550 |
| 4,789,959 | 12/1988 | Hung et al. | 395/550 |
| 4,999,519 | 3/1991 | Kitsukawa et al. | 307/446 |
| 5,006,979 | 4/1991 | Yoshie et al. | 395/550 |
| 5,012,442 | 4/1991 | McCambridge | 395/575 |
| 5,025,387 | 6/1991 | Frane | 364/493 |
| 5,125,089 | 6/1992 | McCambridge | 395/550 |
| 5,151,780 | 9/1992 | Chapman | 358/21 R |
| 5,168,466 | 12/1992 | Kuo et al. | 365/185 |

*Primary Examiner*—Krisna Lim
*Attorney, Agent, or Firm*—Elizbeth A. Apperley

[57] ABSTRACT

A data processor has an input synchronizer (10) which is dynamically enabled by a plurality of control signals provided by a user of the data processor. When the plurality of control signals has a predetermined logic level, a bias generator enable circuit (18) enables a bias generator (16). Subsequently, bias generator (16) enables a differential amplifier (12) to synchronize an asynchronous input signal to an operating frequency of the data processor. When the plurality of control signals does not have the predetermined logic level, bias generator enable circuit (18) disables bias generator (16). Subsequently, differential amplifier (12) is disabled and the asynchronous input is not synchronized with the internal operating frequency of the data processor. Therefore, because the user may choose the logic levels of each of the plurality of control signals, the user may dynamically disable input synchronizer (10) to minimize the power consumption of the data processor.

12 Claims, 1 Drawing Sheet

DATA PROCESSING SYSTEM HAVING A DYNAMICALLY ENABLED INPUT SYNCHRONIZER FOR SELECTIVELY MINIMIZING POWER CONSUMPTION

FIELD OF THE INVENTION

This invention relates generally to a data processor, and more particularly to an input synchronizer in a data processor.

BACKGROUND OF THE INVENTION

When an external information signal is input to a data processor, the external information signal is generally provided at a frequency which is asynchronous to an operating frequency of the data processor. Therefore, before the information signal may be processed and manipulated by internal circuitry within the data processing system, the information signal must be synchronized with the operating frequency of the data processor. Typically, to synchronize the external information signal with the operating frequency of the data processor, the external information signal and a clock signal reflecting the operating frequency of the data processing system are input to a synchronization circuit located within the data processor. The synchronization circuit is generally comprised of a differential amplifier and a bias generator. The external information signal and the clock signal respectively provide a first and a second input of the differential amplifier. The bias generator then provides a bias voltage to a third input of the differential amplifier to enable the differential amplifier to provide a synchronized information signal to remaining circuitry in the data processing system.

To quickly execute the synchronization process and, therefore, add only a slight propagation delay to the input information signal, a fast-switching input synchronizer is sometimes used to synchronize the input information signal to the data processing system. The fast-switching input synchronizer requires a significant amount of current, however, and significantly adds to the power requirements of the entire data processor. However, power consumption in all data processors must be continually minimized to enhance performance in all environments. For example, if a battery provides power for a data processor system, the power consumption of the system must be minimal to enable a user of the system to operate the system for a reasonable amount of time before replacing or recharging the battery. For that reason, the power consumption of each component of the data processing system must be minimized.

Typically, to lower the power consumption of each component of the data processing system, the system may be placed in a low power stop mode of operation. During the low power stop mode of operation, one or a minimum number of clock signals remain functional so the system may become operational when an appropriate external information signal is received. However, the remainder of the clock signals within the data processing system are turned off and, therefore, the components of the data processing system associated with the remainder of the clock signals do not function. Consequently, the associated components do not consume power.

To receive the external information signal from a user of the data processing system, a plurality of input synchronizers, each corresponding to one of a plurality of input pins of the system, must be constantly enabled. Upon receipt of the external information signal, the bias generator must enable the differential amplifier to provide the appropriate signal to internal circuitry within the data processing system. Because the bias generator must be enabled during operation of the data processing system, a significant amount of power is typically consumed. In particular, fast-switching input synchronizers which are often needed to maximize performance of the data processing system use bias generators which must be enabled, and therefore, consume a significant amount of power.

Because input synchronizers consume an excessive amount of power, some designers of data processing systems eliminate the bias generator from the synchronizer circuitry. Therefore, the input synchronizer requires a longer amount of time to provide a signal to internal circuitry with the data processing system. A delay is subsequently introduced and the internal circuitry of the system must wait to receive an external information signal. For these reasons, a designer of a data processing system must generally compromise either the most efficient operation of the data processing system or the speed with which external information signals are processed by the system.

Therefore, a need exists for an internal synchronizer circuit in a data processing system which quickly provides an external information signal to internal circuitry within the system while consuming a minimum amount of power. The data processing system might then be used in a wider variety of environments while maintaining a high level of performance.

SUMMARY OF THE INVENTION

The previously mentioned needs are fulfilled with the present invention. Accordingly, there is provided, in one form, a data processor having a dynamically enabled input synchronizer circuit. The dynamically enabled input synchronizer circuit is comprised of a differential amplifier circuit. The differential amplifier circuit has a first input for receiving a bias voltage signal, a second input for receiving an asynchronous external input signal, and a third input for receiving a clock input signal. The differential amplifier circuit selectively provides a synchronized information signal in response to both the bias voltage signal and the asynchronous external input signal during a predetermined time period. The dynamically synchronized circuit is also comprised of a bias generator circuit coupled to the differential amplifier circuit for selectively providing the bias voltage signal in response to a bias enable signal provided by either a user of the data processor or the data processor itself.

These and other features, and advantages, will be more clearly understood from the following detailed description taken in conjunction with the accompanying drawing.

DETAILED DESCRIPTION OF A PREFERRED EMBODIMENT

Figure 1:
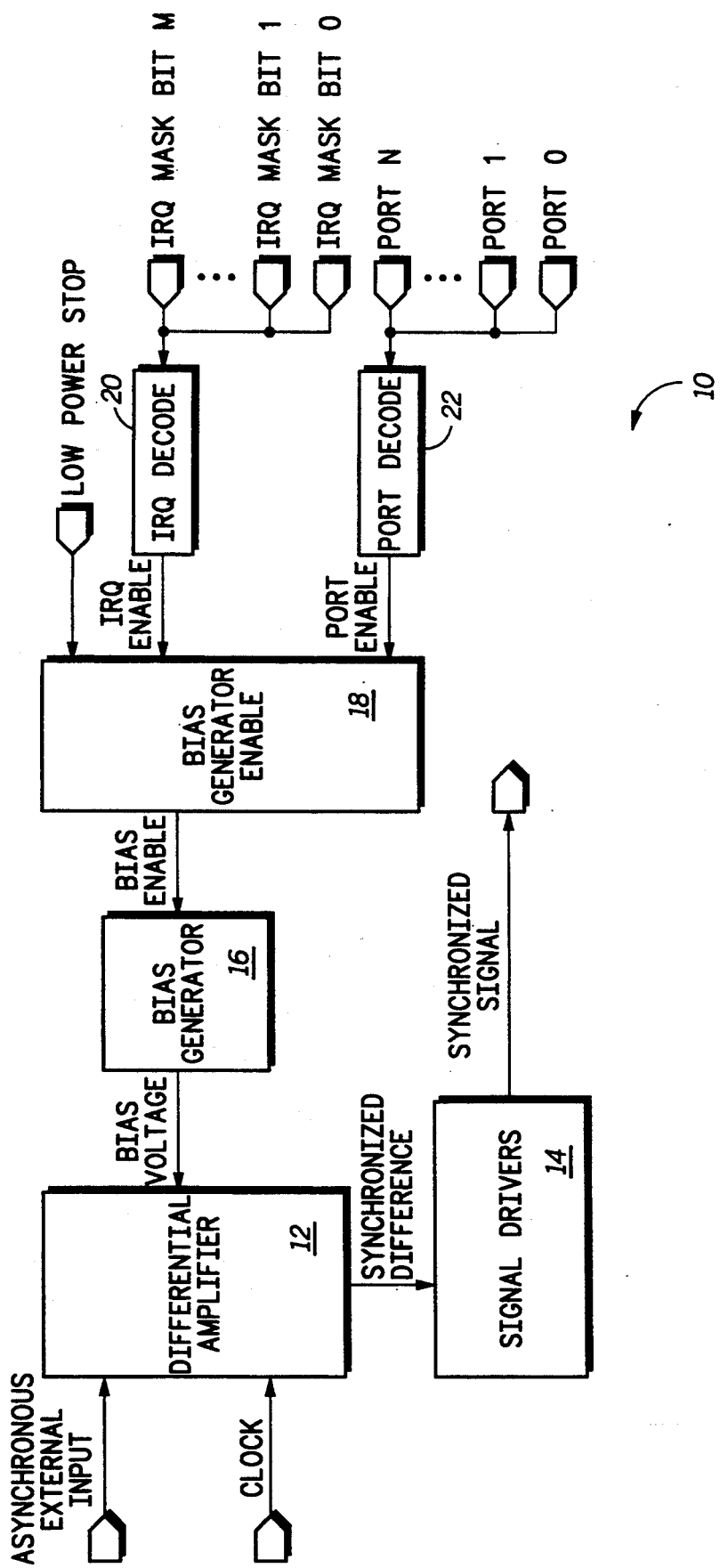
FIG. 1 illustrates in block diagram form a data processor having a dynamically enabled input synchronizer in accordance with the present invention.

The present invention provides an apparatus and a method for noticeably improving the power consumption of a data processor with input synchronizer circuits. By disabling one or more input synchronizer circuits which are not used by a data processor, the power consumed by the data processor is noticeably decreased. However, the disabled input synchronizer circuits may be enabled by a user of the data processor at a later predetermined point in time. In one implementation, the user provides external signals to a predetermined one of a plurality of data or control inputs to either enable or disable the input synchronizer. Similarly, in a second implementation of the invention described herein, a software instruction is used to either enable or disable the input synchronizer. Many embodiments of the present invention exist and each embodiment allows the data processor to dynamically enable and disable one or a plurality of input synchronizer circuits to decrease the power consumption of the entire data processor. Additionally, if a plurality of input synchronizer circuits is implemented on a single data processor, each one of the plurality of input synchronizer circuits may be independently enabled or disabled by a user of the data processor.

Illustrated in FIG. 1 is a portion of a data processing system (not shown) having a dynamically enabled input synchronizer 10 in accordance with the present invention. The dynamically enabled input synchronizer 10 is implemented on one of a plurality of inputs of the data processor and generally has a differential amplifier 12, a signal driver 14, a bias generator 16, a bias generator enable circuit 18, an IRQ decoder 20, and a port signal decoder 22. A plurality of N port signals respectively labelled "Port 0" through "Port N" provide a plurality of N inputs to port signal decoder 22, where N is an integer. The plurality of N port signals is transferred to port signal decoder 22 from a remaining portion of the data processor (not shown). Port signal decoder 22 manipulates the plurality of N inputs to provide a signal labelled "Port Enable" to a first input of bias generator 18.

A plurality of M mask bits are provided via a plurality of signals respectively labelled "IRQ Mask Bit 0" through "IRQ Mask Bit M," where M is an integer value. The IRQ Mask Bit signal provides a plurality of M inputs to IRQ decoder 20. The IRQ Mask Bit 0 through IRQ Mask Bit M signals are transferred to IRQ decoder 20 from the remaining portion of the data processor (not shown). The IRQ decoder 20 manipulates the IRQ Mask Bit 0 through IRQ Mask Bit M signals to provide a signal labelled "IRQ Enable" to a second input of bias generator 18.

A signal labelled "Low Power Stop" is transferred to a third input of bias generator enable 18 from the remaining portion of the data processor (not shown). Bias generator enable 18 manipulates each of the three inputs to provide a signal labelled "Bias Enable" to bias generator 16. Bias generator 16 subsequently provides a signal labelled "Bias Voltage" to a first input of differential amplifier 12.

A signal labelled "Asynchronous External Input" is provided to a second input of differential amplifier 12 and a signal labelled "Clock" is provided to a third input of differential amplifier 12. The Asynchronous External Input signal is provided by an external user of the data processor (not shown). The clock signal is provided either by an external user of the data processor or from an internal circuit (not shown) resident within the data processor. Differential amplifier 12 then provides a signal labelled "Synchronized Difference" to signal driver 14. Signal driver 14 transmits a signal labelled "Synchronized Input" to the remaining portion of the data processor (not shown).

During operation, a user of the data processor may choose to either enable input synchronizer 10 to synchronize an external information value and subsequently provide the external information value to a remaining portion of the data processor (not shown), or disable the input synchronizer 10 and minimize the power consumption of the data processor. In either situation, the user of the data processor must provide an external signal or program the data processor in such a way as to enable or disable the input synchronizer 10 in an appropriate manner.

Assume in a first case that the user of the data processor chooses to synchronize an external information value and provide the value to another portion of the data processor (not shown). To synchronize the external information in the implementation of the present invention illustrated in FIG. 1, the user of the data processor must provide an Asynchronous External Input signal to the second input of differential amplifier 12. The Asynchronous External Input signal typically provides a data or control information value which is needed by the data processor for a data processing operation. Additionally, in the example described herein, the clock signal is internally generated with the data processor and provided to the third input of differential amplifier 12. The Clock signal provides a reference clock frequency for the data processor, and is, therefore, used to synchronize the frequency of the Asynchronous External Input signal with the frequency of the data processor. Additionally, to synchronize the Asynchronous External Input signal to the frequency of the data processor, the user of the data processor must not assert the Low Power Stop signal, one of the IRQ Mask Bit 0 through IRQ Mask Bit M signals, or one of the plurality of port signals. By asserting any one of the signals previously listed, the data processor would be programmed to disable the input synchronizer 10. If neither the Low Power Stop signal, one of the the IRQ Mask Bit 0 through IRQ Mask Bit M signals, nor one of the plurality of port signals is asserted, the bias generator enable 18 will assert the Bias Enable signal with a logic high value. Bias generator enable 18 is implemented as a standard logic configuration which may be as simple or as complex as required by the user of the data processor. Assume in the example described herein that bias generator enable 18 is implemented as a NOR gate (not shown). The NOR gate provides the Bias Enable signal with a logic high value when the Low Power Stop signal, the IRQ Mask Bit signal, and the plurality of port signals are not asserted and have a logic low value. If any one of the Low Power Stop signal, the IRQ Mask Bit 0 through IRQ Mask Bit M signals, or the plurality of port signals is asserted, the NOR gate asserts the Bias Enable signal with a logic low value. The signals necessary to assert the Bias Enable signal with the logic low value are determined by a user of the data processor.

Upon receiving the Bias Enable signal asserted with a logic high value, bias generator 16 is enabled to provide the Bias Voltage signal to the first input of differential amplifier 12. The Bias Voltage signal provides a voltage level which is used as a reference voltage by differential amplifier 12. The Bias Voltage signal is asserted with any voltage level determined by the user of the data processor and bias generator 16 may be implemented using a conventional transistor configuration.

Differential amplifier 12 then compares a voltage level of the Asynchronous External Input signal to the reference voltage level of the Bias Voltage signal at a predetermined period in time determined by the Clock signal. For example, the predetermined period in time may occur when the Clock signal is asserted with a logic high value. At the predetermined point in time, differential amplifier 12 senses a difference between the voltage levels of the Asynchronous External Input signal and the Bias Voltage signal. The difference between the two signals is then amplified and manipulated by differential amplifier 12 to determine whether the Asynchronous External Input signal is a logic high or a logic low value. The logic high or logic low value derived from the Asynchronous External Input signal is transferred from differential amplifier 12 by the Synchronized Difference signal. Differential amplifier 12 is a standard logic circuit which may be implemented by a conventional transistor configuration.

The Synchronized Difference signal is provided as the input to signal driver 14. Signal driver 14 buffers and strengthens the Synchronized Difference signal to provide the Synchronized Input signal to the remaining portion of the data processor. Therefore, the Synchronized Input signal transfers the logic value of the Asynchronous External Input signal to a remaining portion of the data processor at the operating frequency of the data processor. Signal driver 14 may be implemented by a known signal driver circuit using conventional logic circuit components.

Assume in a second case that the user of the data processor chooses to disable input synchronizer 10 and to conserve power consumption of the data processor. The Asynchronous External Input signal typically provides a data or control information value which is needed by the data processor for a data processing operation to a second input of differential amplifier 12. Additionally, the clock signal is internally generated with the data processor and provided to the third input of differential amplifier 12.

To disable input synchronizer 10, the user of the data processor must assert either the Low Power Stop signal, one of the IRQ Mask Bit O through IRQ Mask Bit M signals, or one of the plurality of port signals. By asserting any one of the signals previously listed, the data processor provides control information necessary to disable input synchronizer 10.

The user of the data processor may assert the Low Power Stop signal to place the data processor in a modified mode of operation to conserve power consumption. Typically, the Low Power Stop signal may be asserted by a software programming command or by providing a predetermined logic value to a predetermined input of the data processor.

Depending on a configuration chosen by the user of the data processor, the plurality of IRQ Mask Bit O through IRQ Mask Bit M signals may indicate whether a predetermined interrupt request signal should be recognized by input synchronizer 10. For example, in a first configuration, the IRQ Mask Bit O through IRQ Mask Bit M signals may disable the input synchronizer 10. Similarly, a second configuration of the plurality of signals may allow input synchronizer 10 to synchronize the Asynchronous External Input signal to the operating frequency of the data processor. To determine if the configuration of IRQ Mask Bit O through IRQ Mask Bit M signals enables or disables input synchronizer 10, the plurality of IRQ Mask Bit O through IRQ Mask Bit M signals are input to IRQ decoder 20, and decoded to provide the IRQ Enable signal. In the example described herein, if any one of the IRQ Mask Bit O through IRQ Mask Bit M signals is a logic high value, input synchronizer 10 is disabled and does not synchronize the Asynchronous External Input signal with the operating frequency of the data processor. The IRQ decoder 20 may be implemented with a standard decoder logic configuration in as simple or as complex a form as required by the user of the data processor.

Similarly, if a predetermined configuration of port signals is asserted, the input synchronizer 10 may be disabled and not provide the Asynchronous External Input signal to the operating frequency of the data processor. To determine whether logic values provided by the plurality of N port signals disables input synchronizer 10, each of the plurality of N port signals is input to port signal decoder 22. Port signal decoder 22 decodes the plurality of N port signals to provide the Port Enable signal. In the example described herein, if the Port Enable signal is a logic high value, input synchronizer 10 is disabled. Port signal decoder 22 may be implemented with a standard decoder logic configuration which may be as simple or as complex as the user of the data processor requires.

If either the Low Power Stop signal, the IRQ Enable signal, or the Port Enable signal is asserted, bias generator enable 18 will assert the Bias Enable signal with a logic low value. Assume in the example described herein that bias generator enable 18 is implemented as a NOR gate (not shown). Therefore, if any one of the Low Power Stop signal, the IRQ Enable signal, and Port Enable signal is asserted, the NOR gate will provide the Bias Enable signal with a logic low value. Bias generator enable 18 is implemented as a standard logic configuration which is determined by the user of the data processor.

Upon receiving the Bias Enable signal with a logic low value, bias generator 16 is disabled and does not provide the Bias Voltage signal to the first input of differential amplifier 12. Without the Bias Voltage signal, differential amplifier 12 is also disabled and does not compare a voltage level of Asynchronous External Input signal to the reference voltage level of the Bias Voltage signal at a predetermined period in time determined by the Clock signal. Therefore, the voltage level of the Asynchronous External Input signal is not determined and amplified, and is not provided via the Synchronized Difference signal. Similarly, signal driver 14 is also disabled and does not provide the Synchronized Input signal to the remaining portion of the data processor.

Because differential amplifier 12, signal driver 14, and bias generator 16 are all disabled when one of the Low Power Stop signal, the IRQ Enable signal, or the Port Enable signal is asserted, the power consumption of the input synchronizer 10 is lowered. Although the example illustrated herein provides the data processor with only one input synchronizer 10, a plurality of input synchronizer circuits would most likely be implemented on all or a predetermined portion of the plurality of inputs of the data processor. A user of the data processor with the plurality of input synchronizers will observe a significant decrease in the power consumption of the entire data processor when the input synchronizers are disabled. Furthermore, by disabling input synchronizers which are not needed during operation, the user may further optimize the power consumption of the data processor.

There has been provided herein, a data processor with a dynamically enabled input synchronizer 10 to decrease data processor power consumption. When a predetermined logic level is received on one or a plurality of predetermined control or data inputs of the data processor, input synchronizer 10 is disabled and does not synchronize the Asynchronous External Input signal with the internal operating frequency of the data processor. When input synchronizer 10 is disabled, the Asynchronous External Input signal does not modify or affect operations executed by the data processor. The predetermined logic levels and the plurality of control or data inputs are determined by the user of the data processor. For example, a software instruction to execute a low power stop mode of operation, or a voltage level provided by a port signal of a data processor may be used to generate the predetermined logic level of the control or data input used to disable the input synchronizer 10.

Although, a single input synchronizer circuit in the data processor described herein corresponds to a single input of the data processor, a plurality of input synchronizer circuits corresponding to a plurality of inputs of the data processor may also be implemented. If the plurality of synchronizer circuits is implemented, the user may use a different logical combination of the predetermined plurality of control or data inputs to generate a plurality of Bias Enable signals, each of which corresponds to one of the plurality of synchronizer circuits. For example, for a first input synchronizer circuit, a first Bias Enable signal may only be generated by the Low Power Stop signal. Similarly, for a second input synchronizer circuit, a second Bias Enable signal may be generated by a logical combination of both the plurality of port signals and the plurality of IRQ Mask Bit O through IRQ Mask Bit M signals.

The implementation of the invention described herein is provided by way of example only. However, many other implementations may exist for executing the function described herein. For example, differential amplifier 12 may be implemented as a standard amplifier configuration. Similarly, signal driver 14 is a standard driver circuit used to buffer and strengthen a signal before further operations. Bias generator enable circuit 18 is implemented as a logic function which provides the Bias Enable signal in response to a plurality of control signals. Bias generator enable circuit 18 may be as basic as a NOR gate or a more complex circuit. The configuration of the bias generator enable circuit 18 is dependent on the requirements of the user of the data processor. Similarly, IRQ decoder 20 and port signal decoder 22 may also be implemented in a wide variety of configurations. The configurations of IRQ decoder 20 and port signal decoder 22 are also dependent on the requirements of the user of the data processor.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processor having a plurality of asynchronous external inputs, each one the asynchronous external inputs being input to one of a plurality of input synchronizer circuits, each of the input synchronizer circuits, comprising:
   (a) input means for receiving a first control signal provided by a source external to the data processor for operating the data processor in a low power mode of operation;
   (b) a mask decoder for receiving a plurality of mask control signals provided by a source internal to the data processor, the mask decoder decoding the plurality of mask control signals to provide a second control signal to the bias generator enable means;
   (c) a port decoder for receiving a plurality of port control signals provided by a source external to the data processor, the port decoder decoding the plurality of port control signals to provide a third control signal to the bias generator enable means;
   (d) bias generator enable means for selectively asserting a bias enable signal in response to a logic value, wherein the logic value is selectively determined by the first control signal, the second control signal, and the third control signal, the bias generator enable means having an output for providing the bias enable signal;
   (e) a bias generator having an input coupled to the bias generator enable means for receiving the bias enable signal, the bias generator having an output for providing a bias voltage value, the bias generator providing the bias voltage value when the bias enable signal is asserted;
   (f) a differential amplifier circuit having a first input for receiving the bias voltage value, a second input for receiving an asynchronous external input signal, and a third input for receiving a clock input signal, the differential amplifier circuit synchronizing the asynchronous external input signal to the clock input signal when the bias voltage value is asserted to decrease power consumption of the data processor; and
   (g) a first portion of the plurality of input synchronizers being selectively concurrently enabled to synchronize the corresponding asynchrounous external input when one of the first control signal, the second control signal, the third control signal is asserted and provided thereto and a remaining portion of each of the plurality of input synchronizers remaining inactive when each of the first control signal, the second control signal and the third control signal is negated and provided thereto."

2. The data processor of claim 1 wherein the first control signal is a low power signal to enable the data processor to operate in a low power stop mode of operation.

3. The data processor of claim 1 wherein the second control signal is an interrupt mask signal to selectively enable the data processor to execute an exception processing interrupt routine.

4. The data processor of claim 1 further comprising a signal driver circuit coupled to the differential amplifier for receiving a synchronized information signal, the signal driver circuit strengthening a magnitude of the synchronized information and providing a buffered synchronized information signal to a remaining portion of the data processor.

5. A method for dynamically synchronizing an external input signal, comprising a data processor implemented steps of:
  (a) receiving a first control signal by a bias generator enable means, the first control signal being provided by a source external to the data processor to operate the data processor in a low power mode of operation;
  (b) receiving a plurality of mask control signals by a mask decoder, the mask decoder decoding the plurality of mask control signals to provide a second control signal to tile bias generator enable means, the plurality of mask control signals being provided by a source internal to the data processor;
  (c) receiving a plurality of port control signals by a port decoder, the port decoder decoding the plurality of port control signals to provide a third control signal to tile bias generator enable means, the plurality of port control signals being provided by a source external to the data processor;
  (d) asserting a bias enable signal by a bias generator enable means in response to a logic value, wherein the logic value is selectively determined by the first control signal, the second control signal, and the third control signal, the bias generator enable means having an output for providing the bias enable signal;
  (e) providing a bias voltage value by a bias generator when the bias enable signal is asserted, the bias generator having an input coupled to the output of the bias generator enable means to receive the bias enable signal and an output for providing a bias voltage value to a differential amplifier circuit; and
  (f) synchronizing an asynchronous external input signal to a clock input signal by the differential amplifier circuit when the bias voltage value is asserted to decrease power consumption of the data processor, the differential amplifier circuit having a first input for receiving the bias voltage value, a second input for receiving the asynchronous external input signal, and a third input for receiving a clock input signal."

6. The method of claim 5 wherein the first control signal is a low power signal to enable the data processor to operate in a low power stop mode of operation.

7. The method of claim 5 wherein the second control signal is an interrupt mask signal to selectively enable the data processor to execute an exception processing interrupt routine.

8. The method of claim 5 further comprises the data processor implemented step of:
  coupling a signal driver circuit to the differential amplifier for receiving a synchronized information signal;
  using the signal driver circuit to strengthen a magnitude of the synchronized information; and
  providing a buffered synchronized information signal to a remaining portion of the data processor.

9. A data processor, comprising:
  (a) input means for receiving a first control signal provided by a source external to the data processor for operating the data processor in a low power mode of operation;
  (b) a mask decoder for receiving a plurality of mask control signals provided by a source internal to the data processor, the mask decoder decoding the plurality of mask control signals to provide a second control signal to the bias generator enable means;
  (c) a port decoder for receiving a plurality of port control signals provided by a source external to the data processor, the port decoder decoding the plurality of port control signals to provide a third control signal to the bias generator enable means;
  (d) bias generator enable means for selectively asserting a bias enable signal in response to a logic value, wherein the logic value is selectively determined by the first control signal, the second control signal, and the third control signal, the bias generator enable means having an output for providing the bias enable signal;
  (e) a bias generator having an input coupled to the bias generator enable means for receiving the bias enable signal, the bias generator having an output for providing a bias voltage value, the bias generator providing the bias voltage value when the bias enable signal is asserted; and
  (f) a differential amplifier circuit having a first input for receiving the bias voltage value, a second input for receiving an asynchronous external input signal, and a third input for receiving a clock input signal, the differential amplifier circuit synchronizing the asynchronous external input signal to the clock input signal when the bias voltage value is asserted to decrease power consumption of the data processor."

10. The data processor of claim 8 wherein the first control signal is a low power signal to enable the data processor to operate in a low power stop mode of operation.

11. The data processor of claim 9 wherein the second control signal is an interrupt mask signal to selectively enable the data processor to execute an exception processing interrupt routine.

12. The data processor of claim 9 further comprises a signal driver circuit coupled to the differential amplifier for receiving a synchronized information signal, the signal driver circuit strengthening a magnitude of the synchronized information and providing a buffered synchronized information signal to a remaining portion of the data processor.

* * * * *

UNITED STATES PATENT AND TRADEMARK OFFICE
CERTIFICATE OF CORRECTION

PATENT NO. : 5,432,944
DATED : Jul. 11, 1995
INVENTOR(S) : Charles E. Nuckolls et al.

It is certified that error appears in the above-indentified patent and that said Letters Patent is hereby corrected as shown below:

Column 9, line 12, after "to", change "tile" to --the--.

Column 9, line 18, after "to", change "tile" to --the--.
Column 9, line 42, after "signal." delete["].

Signed and Sealed this

Fourth Day of June, 1996

Attest:

BRUCE LEHMAN

*Attesting Officer*  *Commissioner of Patents and Trademarks*